United States Patent [19]
Starke

[11] Patent Number: 5,889,947
[45] Date of Patent: Mar. 30, 1999

[54] APPARATUS AND METHOD FOR EXECUTING INSTRUCTIONS THAT SELECT A STORAGE LOCATION FOR OUTPUT VALUES IN RESPONSE TO AN OPERATION COUNT

[75] Inventor: William John Starke, Austin, Tex.

[73] Assignee: International Business Machines Corporation, Armonk, N.Y.

[21] Appl. No.: 767,406

[22] Filed: Dec. 16, 1996

[51] Int. Cl.$^6$ .................................................. G06F 15/167
[52] U.S. Cl. .............. 395/200.43; 395/557; 395/200.46; 364/134; 711/164
[58] Field of Search ..................................... 395/393, 557, 395/876, 800.28, 800.04, 200.43, 200.46; 711/147, 220, 164; 364/134

[56] References Cited

U.S. PATENT DOCUMENTS

| | | | |
|---|---|---|---|
| 4,617,625 | 10/1986 | Nagashima et al. ................ | 395/800.04 |
| 5,237,694 | 8/1993 | Horne et al. ............................ | 395/726 |
| 5,297,255 | 3/1994 | Hamanaka et al. ................. | 395/800.14 |
| 5,347,639 | 9/1994 | Rechtschaffen et al. ................ | 395/379 |
| 5,535,346 | 7/1996 | Thomas, Jr. ............................ | 395/393 |

*Primary Examiner*—Kenneth S. Kim
*Attorney, Agent, or Firm*—Casimer K. Salys; Brian F. Russell; Andrew J. Dillon

[57] ABSTRACT

A multiprocessor computer system comprises a plurality of processors, wherein each processor includes an execution unit, a program counter, a result buffer containing a plurality of entries, each entry being allocated to hold an output value of an instruction executed by the execution unit, and an operation counter containing an operation count that is incremented at least when an instruction storing an output value to the result buffer is executed by the execution unit. A particular entry allocated in the result buffer for a given output value is selected as a function of the operation count at the time the instruction generating that given output value is executed. Each processor further includes a decoder that extracts a processor identifier from an instruction to be executed that identifies one of the plurality of processors, wherein one or more input values of the instruction are retrieved from the result buffer of the identified processor. Each decoder also extracts a displacement value from the instruction to be executed that provides a relative difference between the current operation count of the executing processor and an expected operation count of the identified processor when the desired input values are stored in the result buffer of the identified processor. The decoder generates an access key as a function of the displacement value and the current operation count of the processor executing the instruction and retrieves an input value from the result buffer of the identified processor at the entry indexed by the access key.

20 Claims, 8 Drawing Sheets

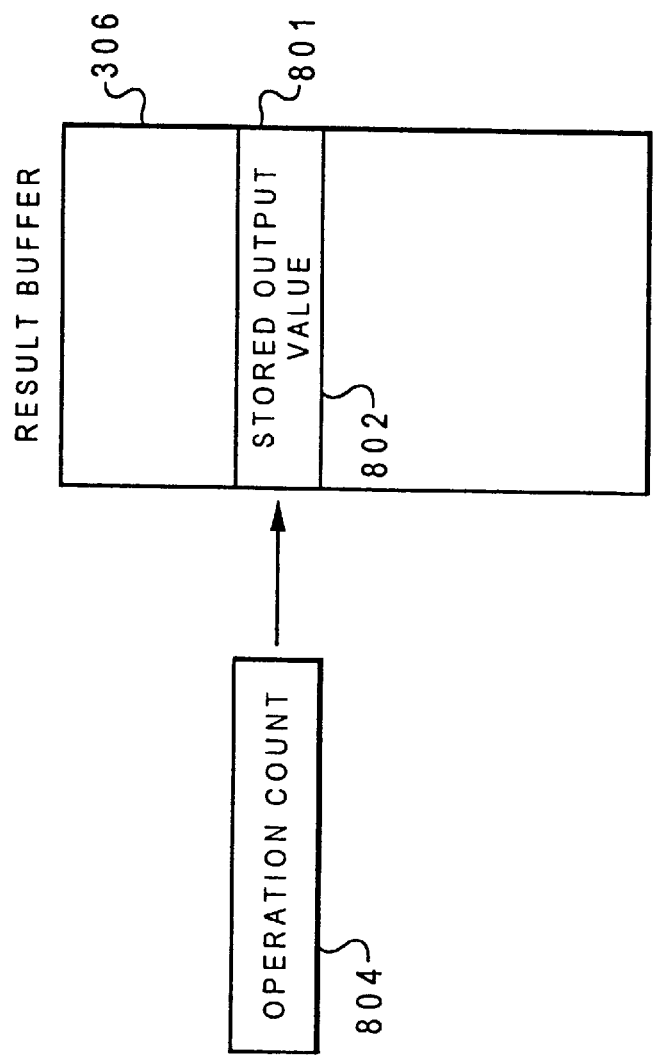

APPARATUS AND METHOD FOR EXECUTING INSTRUCTIONS THAT SELECT A STORAGE LOCATION FOR OUTPUT VALUES IN RESPONSE TO AN OPERATION COUNT

BACKGROUND OF THE INVENTION

1. Technical Field

The present invention relates to improvements in data processing in a multiprocessor computer system.

2. Description of the Related Art

A block diagram of a conventional multiprocessor computer system, abstracted in its simplest terms, is shown in FIG. 1. The processors 101, 111, 121 interact with memory 102 via system bus 122. The program counter 103 belonging to processor 101 specifies a location in memory 102 from which an instruction is fetched. The instruction, formatted as shown in FIG. 2, is dispatched to the execution unit 104 in processor 101. The execution unit 104 performs the operation 201 specified by the instruction. The input values 202 to the operation 201 may be fetched from a location in memory 102 or from a location in register file 105, belonging to processor 101 as represented graphically in FIG. 2. The output values 203 from the operation 201 may be stored to a location in memory 102, or to a location in register file 105, or to the program counter 103, as shown graphically in FIG. 2.

When the input values for an operation executed by one processor are results (i.e. output values) of another instruction executed by another processor within the shared memory multiprocessor environment, the processing of the operation becomes more complex. First, in order for the first processor—for example, processor 101—to obtain such results to be utilized as input values, the second processor—for example, processor 111—must first store those output values to memory 102 so that processor 101 may then retrieve those results from memory 102 to be utilized as input values for the execution of its instruction. As will appreciated, these prerequisite steps consume additional instructions and clock cycles to store and load these values from one processor to the other, thereby creating substantial inefficiencies and undesirable consumption of processor power. Also, the execution of instructions requiring the results of other executed instructions as inputs requires that the processors be synchronized to ensure that the first processor is indeed accessing the appropriate results in memory 102 and not some prior, out-dated values. In the prior art, complicated procedures of data management are required to insure that memory coherency is maintained in the system.

The inefficiencies of sharing data among instructions executing on different processors in a shared memory multiprocessor configuration relative to sharing data among instructions executing on the same processor have shaped the way in which algorithms are defined. For example, an algorithm written for a shared memory multiprocessor is carefully partitioned to minimize the performance degradation due to sharing data produced by an instruction stream executing on one of the processors with an instruction stream executing on another of the processors. This data is typically shared via memory operations and synchronized via locking primitives. Alternatively, an algorithm written for a single processor has no such constraints. Data produced by one instruction is shared with other instructions via a register file, a high bandwidth, low latency mechanism, and synchronized via the linear sequence of instruction execution.

Since the lower bandwidth, higher latency, high overhead parallelism afforded by shared memory multiprocessors is not suitable for exploiting the fine-grained instruction level parallelism (ILP) inherent in many algorithms, processor architects have employed other approaches to construct systems which efficiently execute such algorithms. By employing pipelining techniques, multiple execution units, and sophisticated hardware and software instruction scheduling techniques, they have achieved the parallel execution on a single processor of instructions found within a single instruction stream (which share data via a register file), and have provided a means to efficiently execute algorithms which exhibit ILP.

Unfortunately, two drawbacks limit the overall effectiveness of such approaches. The first drawback is an increase in processor complexity. When a simple, one-instruction-at-a-time, in-order execution processor is extended to execute several instructions at a time, possibly scheduling them for out-of-order execution, the number of circuits, the silicon area, the circuit complexity, the testing complexity, the development time, the risk, and hence the development cost all typically increase dramatically.

The second drawback is due to the fact that not all algorithms are able to take advantage of the computational bandwidth afforded by single processors which are capable of executing multiple instructions in parallel. In other words, these algorithms tend to execute nearly as efficiently on simple, one-instruction-at-a-time processors as they do on complex, multiple-instruction-at-a-time processors. Furthermore, many such algorithms typically scale well when executed in multiprocessor environments.

Thus, in the past, the ideal execution environment for the first class of algorithms has been a single, complex, multiple-instruction-at-a-time, expensive-to-develop processor, while the ideal execution environment for the second class of algorithms has been a shared memory or distributed memory multiprocessor configuration, comprised of several simple, one-instruction-at-a-time inexpensive-to-develop processors.

SUMMARY OF THE INVENTION

The present invention provides a multiprocessor computer system comprising a plurality of processors, wherein each processor includes an execution unit, a program counter, a result buffer containing a plurality of entries, each entry being allocated to hold an output value of an instruction executed by the execution unit, and an operation counter containing an operation count that is incremented at least when an instruction storing an output value to the result buffer is executed by the execution unit. A particular entry allocated in the result buffer for a given output value is selected as a function of the operation count at the time the instruction generating that given output value is executed. Each processor further includes a decoder that extracts a processor identifier from an instruction to be executed that identifies one of the plurality of processors, wherein one or more input values of the instruction are retrieved from the result buffer of the identified processor. Each decoder also extracts a displacement value from the instruction to be executed that provides a relative difference between the current operation count of the executing processor and an expected operation count of the identified processor when the desired input values are stored in the result buffer of the identified processor. The decoder generates an access key as a function of the displacement value and the current operation count of the processor executing the instruction and retrieves an input value from the result buffer of the identified processor at the entry indexed by the access key. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

FIG. 8 shows an alternative embodiment of the result buffer of FIG. 5, in which storage for the usage count is eliminated;

DETAILED DESCRIPTION OF THE PREFERRED EMBODIMENT

Emerging semiconductor technologies have made it viable to package an increasing number of circuits on a single chip. By placing multiple logical entities on the same chip instead of on different chips, a processor architect is able to utilize greatly increased data bandwidth and decreased latency. By placing an entire complex processor on a single chip, processor manufacturers have advanced the state of the art significantly. As densities increase, it becomes possible to develop single chip processors with increasing complexity, at an increasing cost, while experiencing diminishing performance gains.

Utilizing the increased densities in a different way, however, it has become viable to package multiple simple processors on a single chip, providing a cost-effective solution to the second class of algorithms described above.

The present invention utilizes the greatly increased data bandwidth afforded by placing multiple, simple processors on a single chip, to extend an instruction set architecture in such way as to provide multiprocessor data sharing and synchronization mechanisms which exhibit the high bandwidth and low latency of a register file. Since the present invention employs, as its starting point, a multiprocessor configuration of simple processors, an embodiment cost-effectively executes algorithms of the second class, with no alterations.

However, an embodiment of the present invention is also capable of efficiently executing algorithms of the first class mentioned above, those which are typically described by a single instruction stream, and which exhibit a high degree of ILP. This is effected by recompiling the algorithm into multiple, or distributed, corequisite instruction streams, which communicate with one another via the extensions mentioned above. These instruction streams, when executed simultaneously on the multiple simple processors in the configuration, provide a high performance implementation of the algorithm. By utilizing multiple simple processors which communicate via the present invention, instead of a single complex processor, similar performance is attained as will be shown in the preferred embodiment.

Alternatively, an embodiment of the present invention may implement an entirely new instruction set architecture, instead of extending an existing one. Such an embodiment might use the features of the invention to replace, rather than augment, the register file found in most instruction set architectures, thus further reducing the complexity of a processor design.

Figure 3:
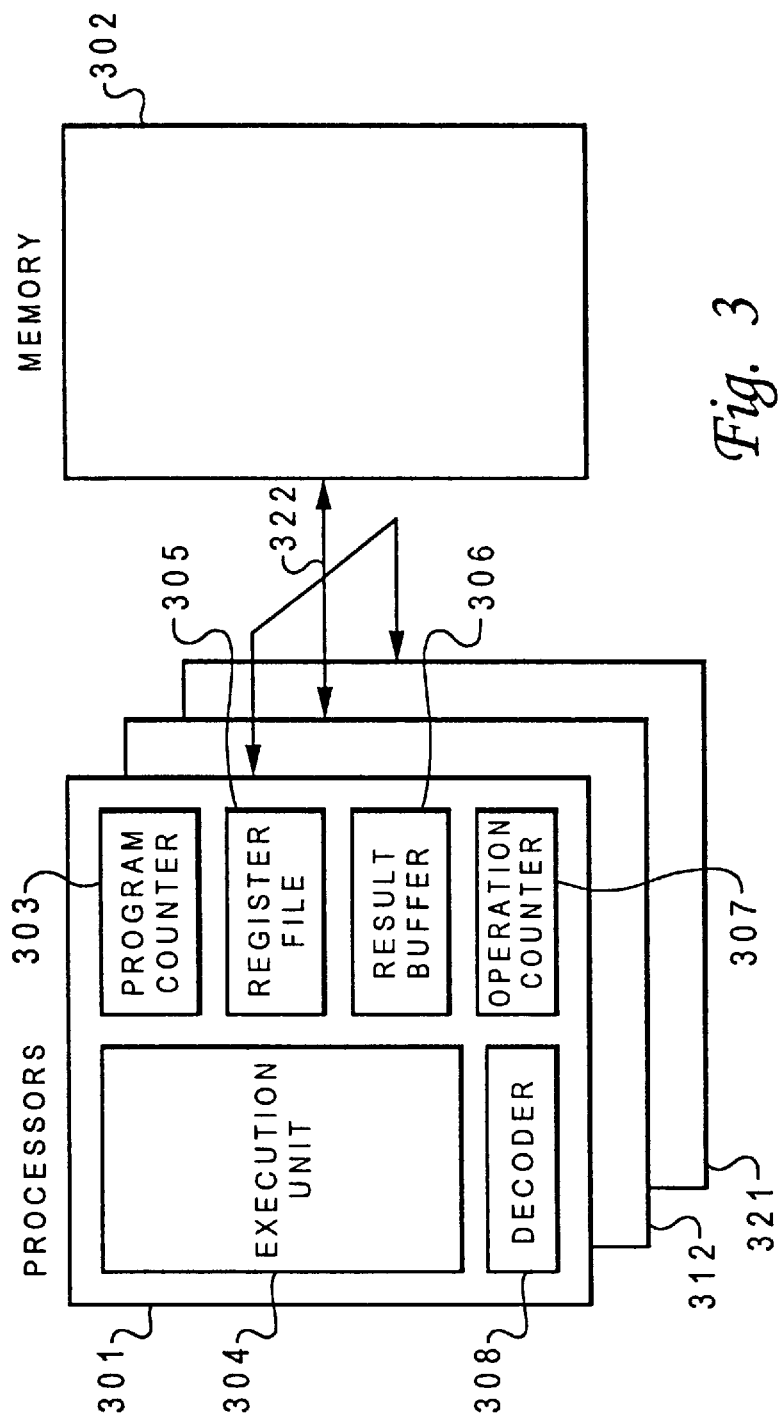
FIG. 3 shows an integrated, multiprocessor, computer system, in accordance with a preferred embodiment of the present invention.

With reference now to FIG. 3, there is shown an integrated, multiprocessor, computer system, in accordance with a preferred embodiment of the present invention. Each processor 301, 312, 321 of the symmetric-multiprocessor (SMP) system includes a program counter 303, execution unit 304, register file 305, result buffer 306, operation counter 307, and decoder 308. The system of the present invention is preferably implemented on a single-chip integrated circuit because the bandwidth required is more easily attained using such a design. System bus 322 interconnects memory 302 and processors 301, 312, and 321. The addition of a result buffer and operation counter in each processor facilitates the processing of data in the multiprocessor by providing a mechanism through which the processors 301, 312, 321 may be synchronized to simultaneously process related instructions and share data with very high bandwidth and very low latency, thereby providing a means of executing corequisite instruction streams. In this way, the multiprocessor system of the present invention can operate as a SMP system to process existing SMP workloads without recompilation or as an ILP processing system that exploits the dramatically increased processor-to-processor communication bandwidth to process a single instruction stream recompiled into multiple, corequisite instruction streams, as if the multiple processors were a single, complex, superscalar processor.

Figure 1:
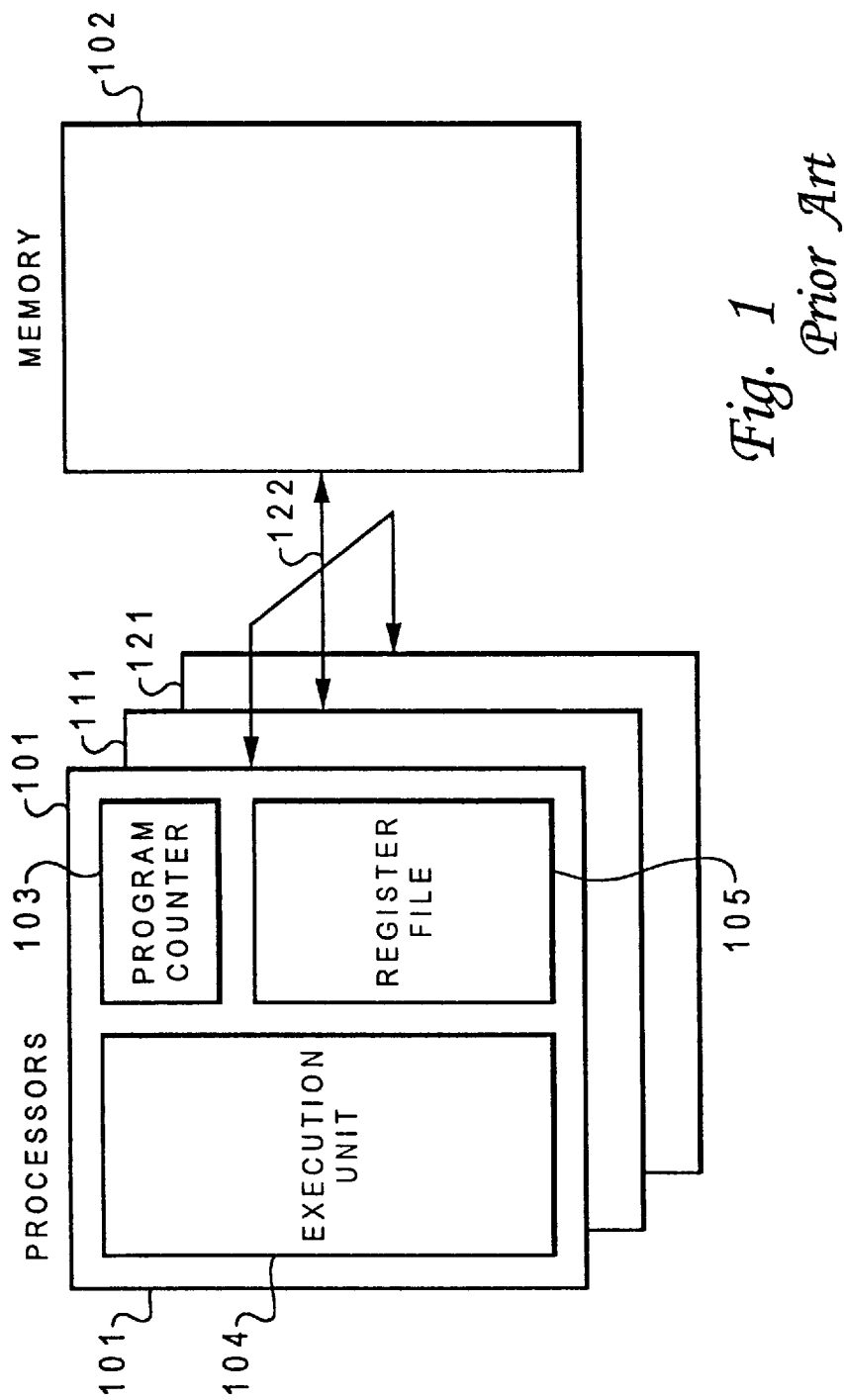
FIG. 1 shows a block diagram of a conventional multiprocessor computer system, abstracted in its simplest terms.
Figure 2:
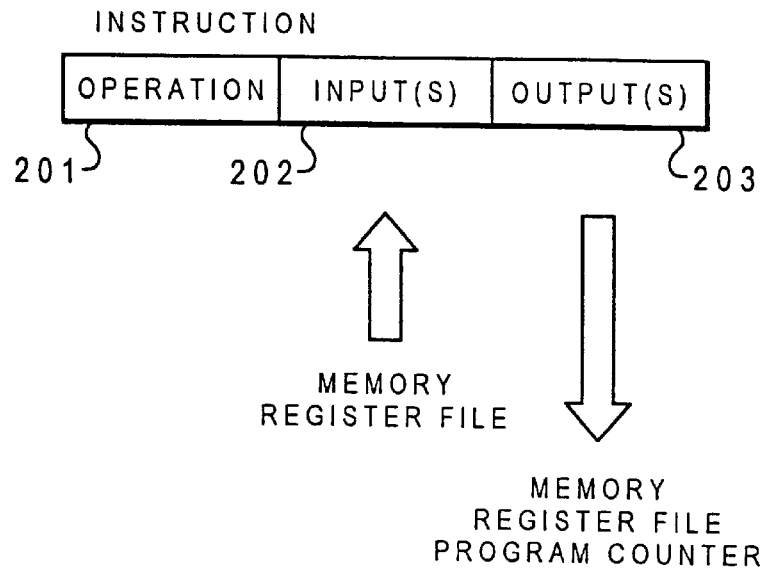
FIG. 2 shows the format of a conventional instruction for execution in a conventional multiprocessor.
Figure 4:
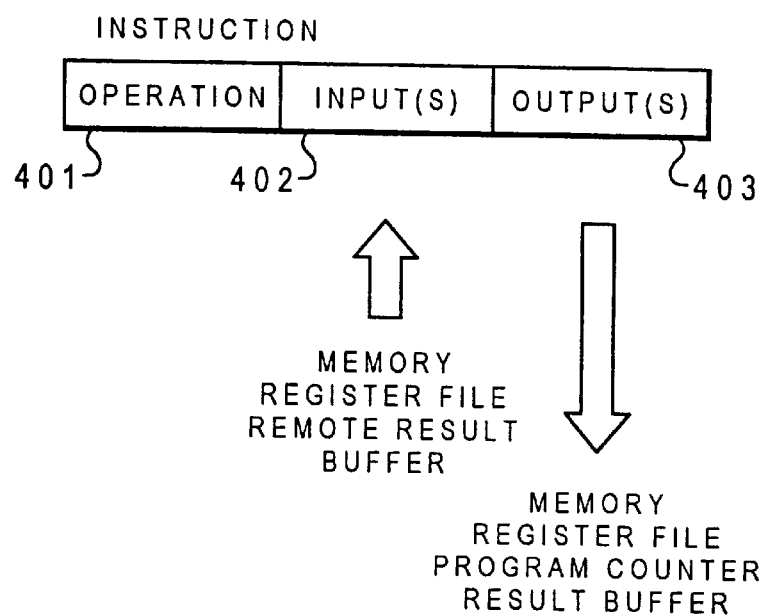
FIG. 4 shows the format of an instruction for execution in accordance with the preferred embodiment of the present invention.

To operate as an ILP processing system, a single instruction stream that exhibits ILP is partitioned by the computer's compiler into multiple instruction streams, which communicate via instruction-set-architecture extensions described herein below. These multiple streams, when executed simultaneously by the kernel's dispatcher on the multiple simple processors 301, 312, 321, attains a processing speed that approaches the performance of a single, complex, superscalar processor. As seen in FIG. 4, an instruction as decoded by decoder 308 and utilized by the multiprocessor system of the present invention may specify that a output 403 may be stored to the result buffer of the executing processor, in addition to the options of storing the output(s) to the processor's register file or program counter, or to memory. Also, as can be seen from FIG. 4, an instruction as utilized by the present invention may specify that an input value 402 is to be fetched from the result buffer of a remote processor, in addition to the options of retrieving the inputs from memory or the processor's register file.

Operation counter 307 contains an operation count that provides a unique numerical count value for each instruction or group or instructions executed by execution unit 304. The operation counter 307 is incremented as certain instructions are executed by its processor. As is described in detail below, the operation counter 307 is incremented at least when an instruction storing an output value to the result buffer 306 is executed by the execution unit 304. Further, provision is made for synchronizing the operation counters 307 across the multiprocessors 301, 312 and 321. As will be appreciated, depending on specific embodiments, this synchronization may be effected in many ways. For example, in preferred embodiments, the incorporation of instructions into the instruction set architecture that assign all operation counters in a particular set of processors within the multiprocessor system to arbitrary values (and then resets the associated result buffers) will synchronize the operation counts of the various processors. In an alternative embodiment, mechanisms within the processors assign all operation counters in a set of particular processors within the multiprocessor to arbitrary values (and resets the associated result buffers) upon the occurrence of certain events not directly correlated with the execution of instructions. The operation count contained within operation counter 307 increases by one as such selected instructions execute within execution unit 304 and remains unchanged in other cases. As implemented within the preferred embodiment, the operation counter must increase by one upon execution of each instruction that specifies an output is to be stored in the result buffer 306.

Two methods for managing result buffer entry allocation and deallocation are described below. Depending on the requirements of a specific embodiment, either of these may be deemed more appropriate for that embodiment.

Figure 5:
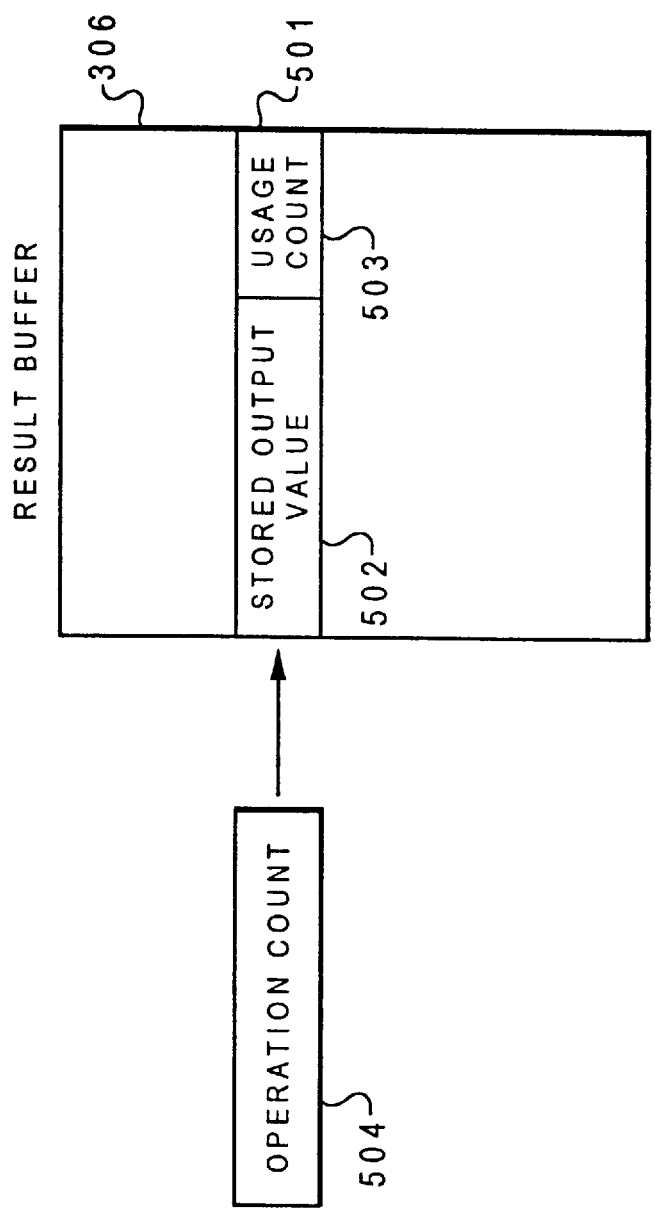
FIG. 5 shows the logical organization of a local result buffer, in accordance with a preferred embodiment of the present invention.
Figure 6:
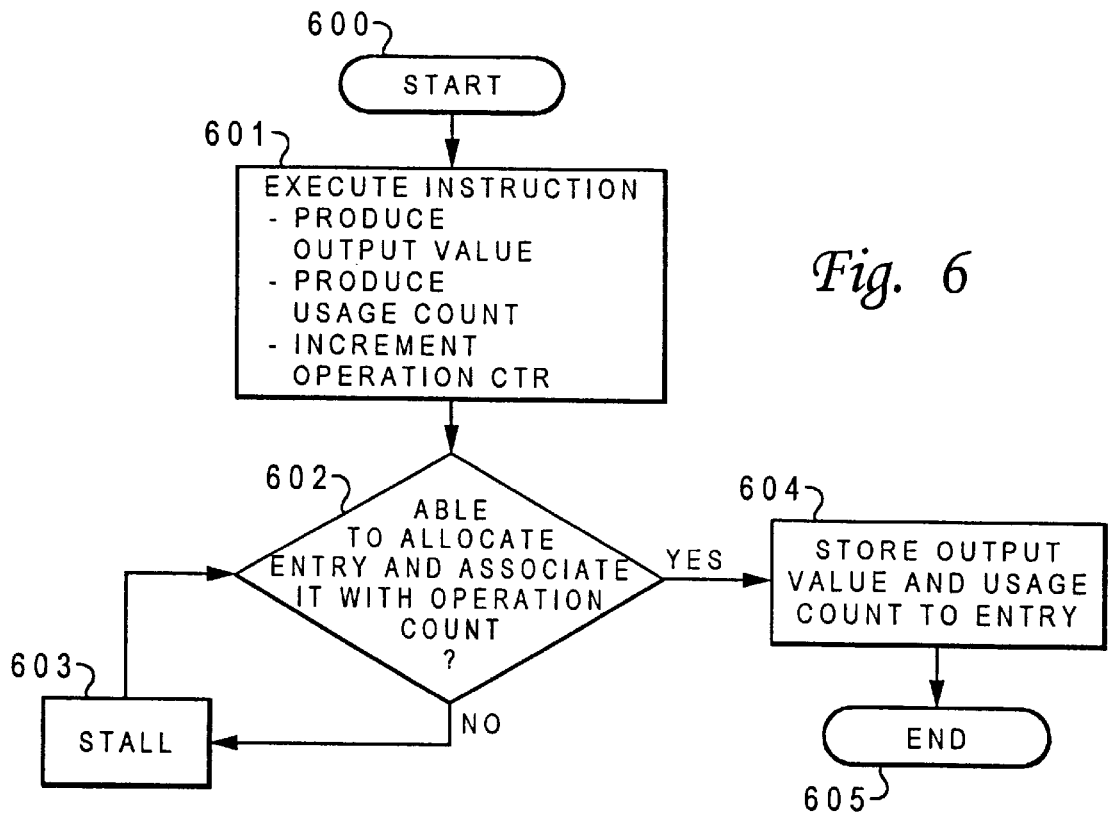
FIG. 6 shows a flow diagram of the method of processing data in the multiprocessor of the present invention when an instruction specifies that an output is to stored in the local result buffer.
Figure 7:
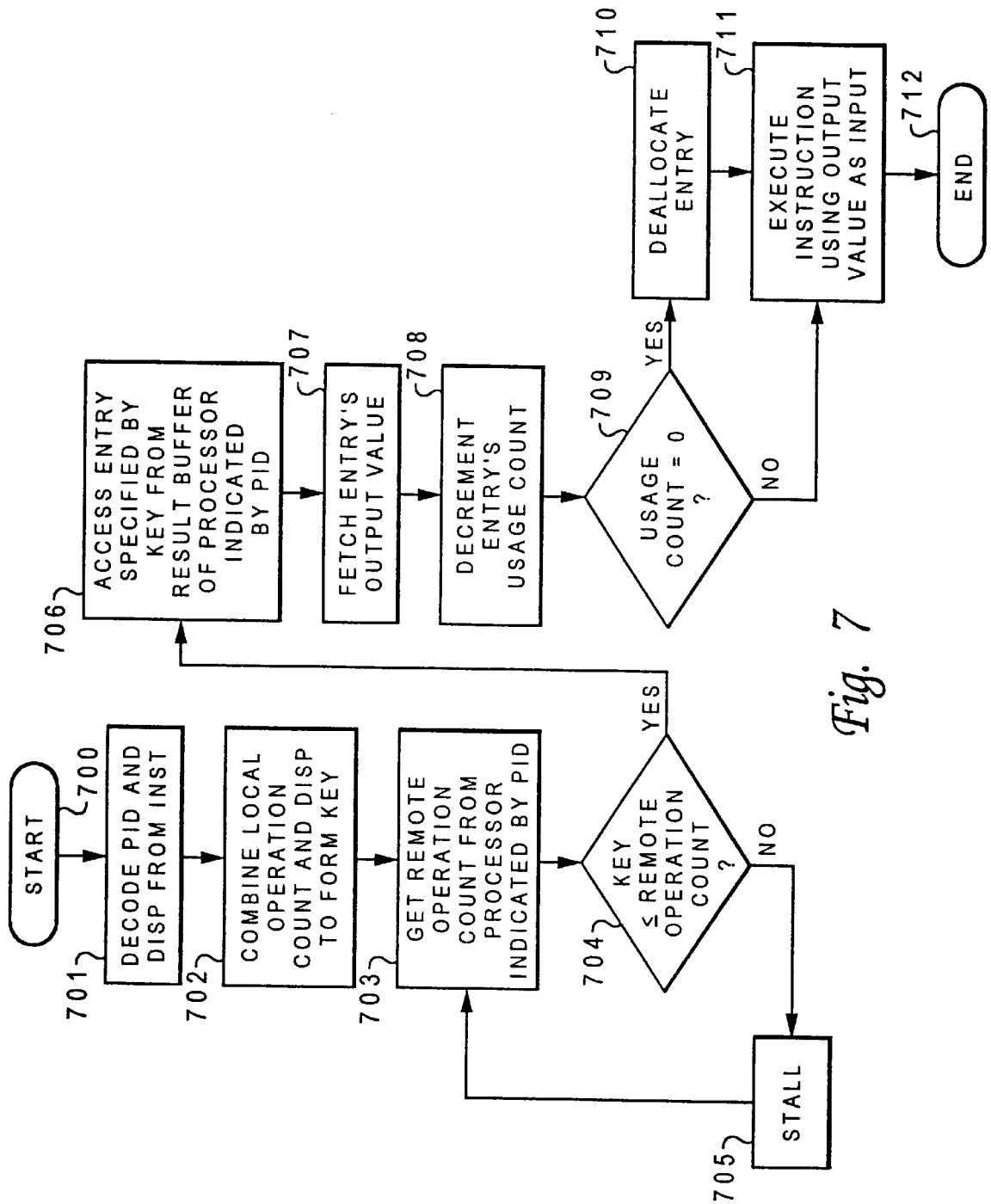
FIG. 7 shows a flow diagram of the process for processing data within the multiprocessor system of the present invention when an instruction specifies that an input is be to fetched from an entry in the result buffer of a remote processor, in accordance with the preferred embodiment of the present invention.

The first method (M1), illustrated in FIGS. 5, 6, and 7, employs a "usage count". Whenever a result buffer entry is allocated, the instruction which generates the result to be placed in the entry specifies a usage count. This usage count indicates the number of times that particular result will be referenced by one or more subsequent instructions. Thus, after the result has been referenced the number of times specified by the usage count, it is no longer needed, and the result buffer entry may be deallocated.

Figure 9:
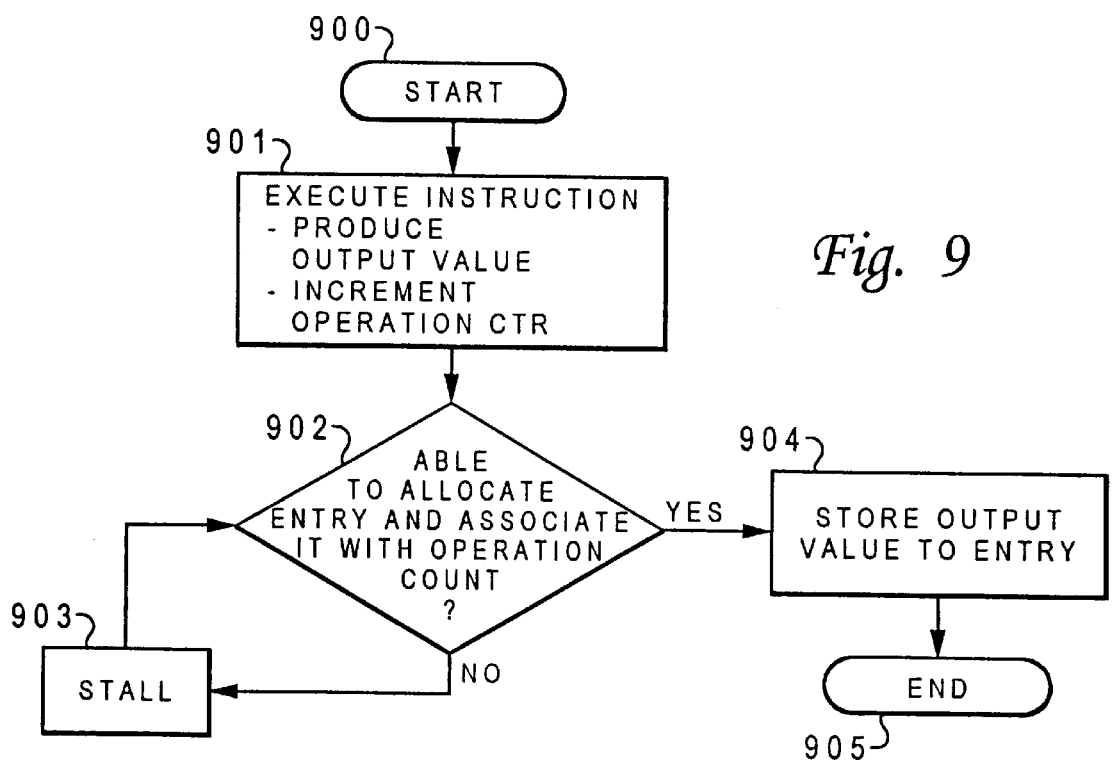
FIG. 9 shows an alternative embodiment of the method of processing data illustrated in FIG. 6, in which the need for a usage count is eliminated.
Figure 10:
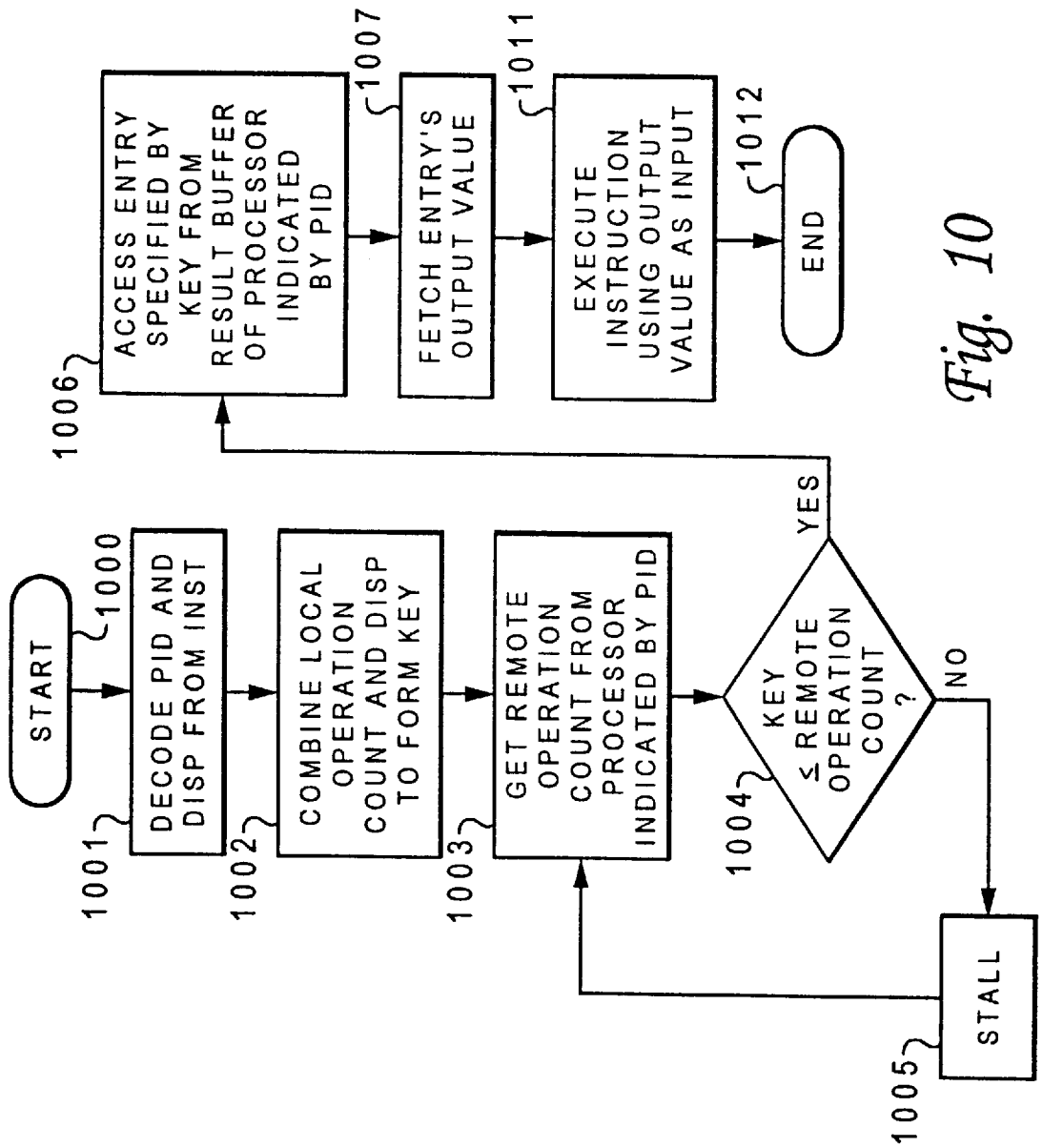
FIG. 10 shows an alternative embodiment of the method of processing data depicted in FIG. 7, in which the need for a usage count is eliminated.

The second method (M2), illustrated in FIGS. 8, 9, and 10, constrains the difference in operation counts among the processors in the system to insure that no processor can over-write a result that another processor has yet to read. For example, if each processor has 16 entries in its result buffer, and a given processor writes data to its result buffer at the fastest possible rate (i.e., one result per operation count), then each time it writes a result to the result buffer it is over-writing the result that it produced when its operation count was equal to its current operation count minus 16. Further, if a processor (A) can read a result from the result buffer of another processor (B) using an operation count displacement of −1 to −4, then that processor (A) is capable of reading a result from the other processor (B) that was produced when the other processor (B) had an operation count equal to the current operation count of processor (A) minus 4. Thus, if the distance between the operation counts of any two processors in the system is prevented from ever exceeding 11, then it is impossible for a processor to over-write a result buffer entry that has yet to be read by another processor.

While method M1 facilitates a greater degree of freedom in the relative progress of processors, method M2 simplifies the task of the compiler by eliminating the need to pre-compute usage counts and the possible need to balance references to results across multiple conditional code paths.

With reference now to FIG. 5, there shown the logical organization of a local result buffer 306, in accordance with a preferred embodiment of the present invention. The result buffer is composed of a discrete number of entries, each of which may be allocated to hold an output value and deallocated when that value is no longer needed. An allocated entry 501 is one of the plurality of entries of result buffer 306, and contains a stored output value 502 and a usage count 503. A given allocated entry 501 is uniquely associated with the processor's current operation count 504 at the time when the entry was allocated to the result buffer. As will be appreciated, this association can be accomplished in an number of ways. It is preferable that a particular operation count be uniquely associated with a particular entry such that an output value may be only stored to that entry when the associated operation count is contained in the operation counter, such as in a direct-mapped configuration. In the preferred embodiment, the result buffer 306 operates as a direct-mapped cache, wherein each entry within the result buffer is directly mapped to a particular operation count. It makes use of the resources comprising one half of the register file, since, when executing in ILP mode, the number of addressable registers is reduced by half, as will be described later. In alternative embodiments, the result buffer may configured as an associative memory. The usage count 503 (or reference count) indicates a number of times the associated output value 502 will be used as an input specified by other instructions executed in another one or more processors (i.e. the number of times the data will be referenced in other instructions). A usage count of zero indicates that the value stored in the result buffer entry will no longer be needed, and thus, that the entry is free to be allocated in the future.

Referring now to FIG. 6, there is shown a flow diagram of the method of processing data in the multiprocessor of the present invention when an instruction specifies that an output 403 is to be stored in the local result buffer 306. The process starts at step 600 and proceeds to decode and execute an instruction in a processor of the multiprocessor, as shown in step 601. The executed instruction produces an output value and a usage count for that value, and increments the operation counter of the processor executing the instruction. At step 602, the processor executing the instruction attempts to allocate an entry in its result buffer to store the output value. The allocated entry must be associated with the current value of the processor's operation count stored in the operation counter. This enables future operations to access the entry within the result buffer by reconstructing the appropriate operation count and then using that operation count as a key to index into the result buffer. If the allocation attempt fails, then in step 603, the processor stalls and retries at step 602 until it is successful. If the allocation attempt is successful, then in step 604 the output value and usage count produced in step 601 are stored into the entry. The process then ends at step 605.

With reference now to FIG. 7, there is shown a flow diagram of the process for processing data within the multiprocessor system of the present invention when an instruction specifies that an input 402 is be to fetched from an entry in the result buffer 306 of a remote processor, in accordance with the preferred embodiment of the present invention. Actually, the term "remote processor", as used in the present invention, may refer either to a processor other than the processor executing the instruction, or to the processor executing the instruction. The process starts at step 700 and proceeds to step 701 where the processor decodes the instruction, extracting a processor identifier (PID) and a displacement value (DISP) from an input field 402. At step 702, the displacement value is combined with the processor's operation count to form an access key. In step 703, the operation count of the remote processor indicated by the processor ID in step 701 is determined. In step 704, the access key formed in step 702 is compared with the remote operation count determined in step 703. If the access key is greater than the remote operation count, then in step 705 the processor stalls and retries steps 703 and 704 until the access key is less than or equal to the remote operation count. If the access key is less than or equal to the remote operation count, then in step 706 the access key formed at step 702 is used to access the selected entry from the result buffer of the remote processor indicated by the processor ID.

Thus, as will be appreciated, the displacement value is the relative difference between the operation count during which the current instruction is executed and the operation count during which the input values to be retrieved from the remote processor are generated and allocated into the remote processor's result buffer. The access key is calculated to give a value for the actual operation count during which the remote input values are generated. By stalling the process (step 705) until it is determined that the remote operation count is greater than or equal to the access key (step 704), it is assured that the results retrieved from the remote processor's result buffer are retrieved after the desired results have been generated and not before. In this way, a processor of the present invention is prevented from prematurely retrieving input values from a remote result buffer before the correct results have been stored to that result buffer. Further, as will be appreciated, because the operation counters of the multiprocessor system have been synchronized, the access key not only provides the operation count upon which the remote results are expected to be generated, but also provides the index to the entry within the remote result buffer allocated to store those results. This is so because the remote processor operates as described in the process flow of FIG. 6 and allocates an entry for output values in association with the current operation count of that processor. Consequently, the entry accessed in the remote result buffer by indexing with the access key allows the correct output values to be fetched from that entry by the process (step 707).

In step 708, the usage (reference) count associated with the accessed entry in the remote result buffer is decremented. In step 709, if the decremented usage has fallen to zero, then in step 710 the entry within the remote result buffer is deallocated from the result buffer so that it can be reused by a future allocation. In either case, the instruction within the immediate processor requiring the remote results as input values is executed at step 711 using the retrieved output values from step 707 as input(s). Thereafter, the process ends at step 712.

FIGS. 8, 9, and 10 differ from FIGS. 5, 6, and 7 in that they illustrate the second method (M2) for managing result buffer entry allocation and deallocation, which method does not require that a usage count be associated with each result buffer entry. In most respects, FIGS. 8, 9, and 10 show the same behavior as FIGS. 5, 6, and 7, and the numbering scheme used in FIGS. 8, 9, and 10 parallels that used in FIGS. 5, 6, and 7. Instead of describing the figures in their entirety (which would be redundant), only the differences between FIGS. 8, 9, and 10 and corresponding FIGS. 5, 6, and 7 are described below. All portions not described below should be assumed to be identical to their counterparts in FIGS. 5, 6, and 7.

With reference now to FIG. 8, method M2 differs from method M1 in that a result buffer entry (for M2) does not contain a usage count. In method M2, an instruction which produces a result that is written to the result buffer does not specify a usage count. Therefore, no usage count is written to the result buffer entry and the result buffer entries do not include a mechanism to retain a usage count.

With reference now to FIG. 9, method M2 differs from method M1 in the following ways. In step 901, an instruction produces no usage count as it does in step 601. In step 902, the current processor's operation count is compared to the operation counts of the other processors. Let OCD be the difference between the current processor's operation count and the operation count of the processor with the lowest operation count. Let D be the largest displacement magnitude that can possibly be used when generating a key as in step 702 of FIG. 7. For example, if the DISP field could range from −1 to −4, D would be 4. Let RE be the number of entries found in the result buffer of each processor. Given the values OCD, D, and RE, step 902 behaves as follows: If the sum of OCD and D is less than RE, an entry may be allocated and control passes to step 904. Otherwise, an entry may not be allocated and control passes to step 903. In step 904, a usage count is not stored into the newly allocated result buffer entry as it is step 604.

With reference now to FIG. 10, method M2 differs from method M1 in that the usage count manipulation and result buffer entry deallocation performed at steps 708, 709, and 710 of FIG. 7 have no analog in FIG. 10. Rather, in method M2, illustrated in FIG. 10, control passes directly from step 1007 to step 1011. This is due to the fact that in method M2, an instruction which reads a value from a result buffer entry does not actively participate in the deallocation of that entry. Rather, the entry is deallocated implicitly once its associated operation count falls outside of the range of operation counts that can be produced by any processor forming a key as described in step 702 of FIG. 7.

EXAMPLE INSTRUCTION SET ARCHITECTURE

In order to illustrate the present invention, an example of a computer instruction set architecture for operation in the present invention is now described. First, a hypothetical computer instruction set architecture (A), indicative of the prior art is described. Next, an example program fragment is coded for the hypothetical architecture (A) of the prior art, and the execution of that program fragment on a number of typical computer implementations is discussed. Next, the hypothetical architecture is extended (A') to operate in the multiprocessor system of the preferred embodiment of the present invention. Next, the example program fragment is shown re-coded for the extended computer instruction set architecture (A') of a preferred embodiment of the present invention, and the execution of that re-coded program fragment on one example of a multiprocessor computer system according to the present invention is discussed.

Let the hypothetical computer instruction set architecture (A) be a stored program machine, with an addressable memory (M), a set of 32 high-speed buffers used to hold data values, i.e., general purpose registers (R), a set of 8 high-speed buffers used to hold condition codes (CR), and a program counter (PC), which contains the memory address (in M) of the next instruction (I) to execute. The types of instructions (I) are divided into several classes as follows:

1. ALU (Arithmetic/logical) instructions, whose encodings include an operation code (e.g., add, subtract, multiply, etc.), two input register names (i.e., two 5-bit values to indicate two of the 32 general purpose registers from which to retrieve data values which serve as inputs to the operation), and one output register name (indicating the register in which to place the data value produced by the operation);
2. ALU/Immediate instructions, which are identical to ALU instructions, except that one of the input register names is replaced by an immediate data value, encoded directly into the instruction;
3. Load instructions, whose encodings include an operation code, a displacement value, one input register name (the displacement and the data value in the named input register being added together to specify the name of a memory location from which to retrieve a data value), and one output register name (indicating the register in which to place the data value retrieved from memory);
4. Store instructions, whose encodings include an operation code, a displacement value, one input register name (the displacement and the data value in the named input register being added together to specify the name of a memory location to which to place a data value), and another input register name (indicating the register from which to retrieve the data value that is to be placed into memory);
5. Test instructions, whose encodings include an operation code that specifies a logical test, two input register names indicating the registers whose data values will be compared, and one output condition code register (CR) name (indicating which of the 8 condition code slots will be set to indicate the outcome of the test);
6. Test/Immediate instructions, which are identical to Test instructions, except that one of the input register names is replaced by an immediate data value, encoded directly into the instruction;
7. Control-Flow instructions, whose encodings include an operation code that specifies the criteria for causing the (PC) to be set to point to a new location in memory, an input condition code register name, whose value is subjected to the above criteria, and a specification of a new location in memory from which to fetch the next instruction if the above criteria are met.

EXAMPLE PROGRAM FRAGMENT

The following defines a program fragment written for the hypothetical computer instruction set architecture (A). A mixture of assembler mnemonics and pseudo-code are used to indicate both the behavior of the algorithm as well as its implementation in terms of machine instructions, and should be easily understood by those skilled in the art. The ID associated with a given instruction is used later to concisely refer to that particular instruction.

Initial State: Register R2 contains base address of data in memory

| Label | Opcode | Operands | ID |
|---|---|---|---|
| START | LOAD | R1 <- - MEM (R2 + OFFSET1) | I1 |
|  | LOAD | R3 <- - MEM (R2 + OFFSET2) | I2 |
|  | ADD | R4 <- - R1, R3 | I3 |
|  | LOAD | R5 <- - MEM (R2 + OFFSET3) | I4 |
|  | SUB | R6 <- - R5, DELTA1 | I5 |
|  | MULT | R7 <- - R4, R6 | I6 |
|  | LOAD | R8 <- - MEM (R2 + OFFSET4) | I7 |
|  | CMP | C1 <- - R7, R8 | I8 |
|  | BLE | C1 - -> PART2 | I9 |
|  | ADD | R9 <- - R7, DELTA2 | I10 |
| LOOP | LOAD | R10 <- - MEM (R7 + OFFSET5) | I11 |
|  | ADD | R11 <- - R10, R9 | I12 |
|  | SUB | R12 <- - R10, DELTA3 | I13 |
|  | LOAD | R13 <- - MEM (R7 + OFFSET6) | I14 |
|  | ADD | R14 <- - R13, R9 | I15 |
|  | SUB | R15 <- - R13, DETLTA4 | I16 |
|  | MULT | R16 <- - R11, R15 | I17 |
|  | MULT | R17 <- - R12, R14 | I18 |
|  | CMP | C2 <- - R14, R11 | I19 |
|  | BLE | C2 - -> PART3 | I20 |
|  | STORE | R16 - -> MEM (R7 + OFFSET5) | I21 |
|  | ADD | R18 <- - R17, R16 | I22 |
|  | STORE | R18 - -> MEM (R7 + OFFSET6) | I23 |
|  | B | - - - - - -> PART4 | I24 |
| PART3 | STORE | R17 - -> MEM (R7 + OFFSET5) | I25 |
|  | SUB | R18 <- - R17, R16 | I26 |
|  | STORE | R18 - -> MEM (R7 + OFFSET6) | I27 |
| PART4 | ADD | R7 <- - R7, DELTA5 | I28 |
|  | CMP | C3 <- - R7, LIMIT | I29 |
|  | BLE | C3 - -> LOOP | I30 |
| PART2 | STORE | R7 - -> MEM (R2 + OFFSET1) | I31 |
|  | EXIT |  |  |

EXECUTION TIMINGS

Due to the complexities introduced into instruction execution timings due to factors such as cache misses, branch prediction, and speculative execution, the timings shown for the present example make the following simplifying assumptions: a) all loads, stores, and instruction fetches hit in the cache, and thus cause no stall cycles; b) control flow dependencies must be resolved before execution may proceed, thus eliminating the factors typically involved with branch prediction and speculative execution. The effects of all these factors are, however, discussed when the timings for (A) and (A') are compared. Note that unconditional branches (I24) are folded, incurring no penalty and imposing no dependency. Due to the fact that there are multiple possible execution paths for the program fragment, only one is shown here, in which the main loop (I11 through I30) iterates twice, following the taken path for (I20) during the first iteration, and following the not-taken path for (I20) during the second iteration.

The execution timing of the example program fragment will be described in conjunction with two prior art computer organizations that implement the computer instruction set architecture (A): one structure is called "simple", having a single execution unit, which is capable of executing one instruction per cycle, and which must execute instructions in the order that they are fetched from memory; the other is called "complex", having multiple execution units, which is capable of executing four (for example) instructions per cycle, in any order, subject only to the constraint that in order to execute during a given cycle, all of an instruction's data and control-flow dependencies must have been satisfied in or before the previous cycle.

Execution timing for "simple" machine implemention:

| Cycle | Eunit0 |
|---|---|
| 1 | I1 |
| 2 | I2 |
| 3 | I3 |
| 4 | I4 |
| 5 | I5 |
| 6 | I6 |
| 7 | I7 |
| 8 | I8 |
| 9 | I9 (Not Taken) |
| 10 | I10 |
| 11 | I11 |
| 12 | I12 |
| 13 | I13 |
| 14 | I14 |
| 15 | I15 |
| 16 | I16 |
| 17 | I17 |
| 18 | I18 |
| 19 | I19 |
| 20 | I20 (Taken) |
| 21 | I25 |
| 22 | I26 |
| 23 | I27 |
| 24 | I28 |
| 25 | I29 |
| 26 | I30 (Taken) |
| 27 | I11 |
| 28 | I12 |
| 29 | I13 |
| 30 | I14 |
| 31 | I15 |
| 32 | I16 |
| 33 | I17 |
| 34 | I18 |
| 35 | I19 |
| 36 | I20 (Not Taken) |
| 37 | I21 |
| 38 | I22 |
| 39 | I23 |
| 40 | I24 (Folded) |
| 41 | I28 |
| 42 | I29 |
| 43 | I30 (Not Taken) |
| 44 | I31 |

Execution timing for "complex" machine implemention:

| Cycle | Eunit0 | Eunit1 | Eunit2 | Eunit3 |
|---|---|---|---|---|
| 1 | I1 | I2 | I4 | I7 |
| 2 | I3 | I5 | | |
| 3 | I6 | | | |
| 4 | I8 | | | |
| 5 | I9 (Not Taken) | | | |
| 6 | I10 | I11 | I14 | |
| 7 | I12 | I13 | I15 | I16 |
| 8 | I17 | I18 | I19 | |
| 9 | I20 (Taken) | | | |
| 10 | I25 | I26 | I28 | |
| 11 | I27 | I29 | | |
| 12 | I30 (Taken) | | | |
| 13 | I11 | I14 | | |
| 14 | I12 | I13 | I15 | I16 |
| 15 | I17 | I18 | I19 | |
| 16 | I20 (Not Taken) | | | |
| 17 | I21 | I22 | I28 | I24 (Folded) |
| 18 | I23 | I29 | | |
| 19 | I30 (Not Taken) | | | |
| 20 | I31 | | | |

In this example, the simple implementation of (A) takes 44 cycles to execute the program fragment, while the complex implementation takes only 20 cycles. Thus, there is a performance advantage to constructing a complex machine to execute algorithms which exhibit ILP behavior similar to that exhibited by this code fragment. Although some of this advantage diminishes when finite storage effects are taken into account, industry trends show that computer manufacturers still justify the greater risks and expenditures involved in developing complex processors. The next sections show how the present invention provides some of the performance benefits of complex machines, while enjoying the lessened design cost and complexity of the simple machines.

INSTRUCTION SET ARCHITECTURE OF THE PRESENT INVENTION

The present invention may be embodied either as a new instruction set architecture, which provides broad function with a greatly simplified underlying machine organization, or as an extension to an existing instruction set architecture, which enables the multiple processors in an SMP configuration of said architecture to act in concert to solve a single threaded problem more quickly. In the present example, the latter is described by showing the incorporation of the mechanisms of the present invention into the hypothetical computer instruction set architecture (A), yielding (A'). Also, in order to more fully describe the additional programming requirements imposed by result buffer management method M1, the preferred embodiment incorporates method M1.

As shown in FIG. 4, the instruction encodings are extended, such that an instruction's outputs may be routed to a processor's result buffer, and its inputs may be routed from the result buffer of the processor on which it is executing or from the result buffer of a remote processor. The present embodiment extends the instruction set such that an instruction that addresses the registers (via a 5-bit name) as an input or as an output specifies either 1) one of 16 general purpose registers, or 2) the result buffer as an input or an output. It should be noted that the invention provides a means for one and only one output to be written to the result buffer per operation count, and hence, in this case, per instruction. As explained above, an entry in the result buffer is logically associated with the operation count of the processor at the time the data for the entry is stored in the result buffer. In the preferred embodiment, there are 16 result buffer entries that are associated with 16 operation counts in a round-robin manner. Thus, when the next operation count occurs, the result data is stored in the first entry of the result buffer (assuming the usage count of the previous data has reached 0). Instructions that modify more than one general purpose register, such as LOAD's which automatically update an index register, may only write one output to the result buffer. The encodings for the input/output operations for the preferred embodiment are illustrated below:

5-bit operation input/output encodings for (A):

| Input: | 'RRRRR' : | Specifies one of 32 registers via RRRRR |
|---|---|---|
| Output: | 'RRRRR' : | Specifies one of 32 registers via RRRRR |

5-bit operation input/output encodings for (A'):

| Input: | '0RRRR' : | Specifies one of 16 registers via RRRR |
|---|---|---|
| | '1PPDD' : | Specifies the result buffer in one of 4 processors via PP |
| | | Specifies an operation count displacement (−4 to −1) via DD |
| Output: | '0RRRR' : | Specifies one of 16 registers via RRRR |
| | '1CCCC' : | Specifies the result buffer of the local processor |
| | | Specifies the result's usage count (0 to 15) via CCCC |

While this effectively cuts the number of general purpose registers available to a processor of an existing design in half, the present invention provides the capability for processors to communicate with one another in a buffered fashion with the same high bandwidth traditionally enjoyed only when interacting with a local register file. Alternatively, the functionality of the present invention can be realized by the addition of result buffer registers to the processor design.

It should be noted that, for simplicity, the hypothetical machines in this example do not provide a file of floating point registers, as do most machines. It should be clear, however, that the same technique of using general purpose register encodings for general purpose result buffers is equally applicable to floating point register encodings and floating point result buffers. Similarly, the hypothetical machines described herein specify that test instruction results be directed to one of 8 condition code registers, and that control-flow instructions read their inputs from these registers. Just as the general purpose register encodings are extended by the present invention, likewise the condition code register encodings can be extended.

```
3-bit operation input/output encodings for (A):

Input:   'RRR' : Specifies one of 8 CR's via RRR
Output:  'RRR' : Specifies one of 8 CR's via RRR
3-bit operation input/output encodings for (A'):

Input:   '0RR' : Specifies one of 4 CR's via RR
         '1PP' : Specifies the result buffer in one of 4 processors
                 via PP
                 Specifies an operation count displacement of -1
Output:  '0RR' : Specifies one of 4 CR's via RR
         '1CC' : Specifies the result buffer of the local processor
                 Specifies the result's usage count (0 to 3) via CC
```

It should be noted that the processor field (which selects one of 4 processors in this embodiment) does not in fact limit the total number of processors interconnected via this invention. Rather, it constrains a single processor such that it can directly interact with only 4 of its neighbors (one of whom may be the processor itself). Varying embodiments may implement inter-processor connection topologies specifically suited to their needs. In order to more effectively teach the present invention, the present embodiment employs a simple topology. Though the invention does not preclude the use of an unlimited number of processors, the present embodiment, for simplicity, restricts a compiler to distributing a given program across four virtual processors, by mapping each virtual processor directly to one of four physical processors. Thus, the two (PP) bits described above provide a means to name one of four physical processors in a SMP (actually the invention does not require shared memory, and could be used in some applications with processors which maintain private memories).

It should be noted that the precise encodings shown here are quite arbitrary and are only provided by way of illustration to better understand the present invention. The coding and architecture of this example is not intended to limit the scope of the present invention, and is detailed merely for illustrative purposes.

As stated above, various embodiments may cause the operation count to be incremented under different circumstances, provided that they do so at least whenever a result is written to a result buffer.

Variants on the present embodiment include, but are not limited to the following:

a) incrementing the operation count upon the execution of every single instruction;
b) incrementing the operation count only upon the execution of instructions which write a result to the result buffer;
c) incrementing the operation count only upon the execution of instructions which either read one or more of their input values from a result buffer and/or write a result to the result buffer;
d) encoding a flag into each instruction which indicates whether or not to increment the operation count upon the execution of that instruction;
e) encoding a field into each instruction which specifies an offset (zero to n) which is added to the operation count upon the execution of that instruction;
f) incorporating multiple operational modes into the instruction set architecture, each of which may employ one of the previously described variants.

Those skilled in the art will note that the ability to associate instruction groupings of arbitrary size with a given operation count, coupled with the allowance in the machine implementation for processors to progress through operation counts at arbitrary rates (insofar as they do not stall due to not-yet-produced data values, or due to the inability to allocate a result buffer in which to store an output value), provides a means for processors to make forward progress, even while their neighbors are stalled due to unanticipatable execution time factors such as cache misses or mispredicted branches. This asynchronous nature of the present invention is clearly advantageous when compared to synchronous (or lock-step) ILP execution techniques, such as VLIW (very long instruction word), in which any instruction in a synchronously executed group may stall, causing all other instructions in that group to stall.

It should be noted that although the programmer thinks of the operation count as a value which may grow without bound, in the hardware implementation it is permissible for the operation count to be represented by a small number of bits, and to "roll over" to zero, once the maximum value is exceeded. This is possible since the exact value of the operation count is never important, but rather, it is the value of the operation count relative to the operation counts of the other processors in the system that is important. Since the relative distance between the operation counts of any two processors is constrained by data dependencies and buffer allocation, there is a known maximum distance between the operation counts of any two processors in the system. As long as this distance may be represented by a given hardware implementation of the operation counter, that implementation will operate correctly.

For simplicity, in the present embodiment, a processor increments its operation count every time it executes an instruction. This, of course, means that to stay in "sync", each processor must execute the same number of instructions; so, the compiler may have to insert several no-ops in order to keep an operation count balance.

As also stated above, a correct implementation of the present invention requires some means to place the processors in a known state so that they may communicate with each other properly. To serve this end, the present embodiment introduces one new user level instruction, one new supervisor level instruction, and one new exception type as follows:

A SPAWN instruction specifies one of the four processors, and an instruction address. If the specified processor is the same as the processor executing the SPAWN instruction, that processor's operation count is set to zero, its result buffers are cleared (i.e., all reference counts are set to zero), and its program counter (PC) is set to begin fetching instructions from the newly specified instruction address. If the specified processor (PS), is different from the processor executing the SPAWN instruction (PE), then the operation count (OC) of (PS) is set to that of (PE), the result buffers of (PS) are cleared, and the program counter (PC) of (PS) is set to begin fetching instructions from the newly specified instruction address.

By using the SPAWN instruction, a sequence of instructions being executed by one processor can initiate and synchronize the execution of a sequence of instructions on another processor. By repeating this process, all the processors are capable of initiating the concurrent execution of co-dependent instruction sequences.

A PREEMPT instruction is a supervisor level instruction. It specifies a processor to which a PREEMPT exception is issued. It is designed to enable the kernel dispatcher to cause task switches to occur on all processors that are executing co-dependent threads.

A PREEMPT exception, like any exception, causes the interrupted processor to stop executing instructions from its current instruction stream, and begin executing the instructions pointed to by the exception vector. As stated above, it is caused when another processor executes a PREEMPT instruction, and is designed to insure that all co-dependent threads comprising a task are switched in concert by the kernel's dispatcher.

SAMPLE PROGRAM FRAGMENT RE-CODED FOR THE EXTENDED ISA (A') OF THE PRESENT INVENTION

Below, the sample program fragment is shown encoded for execution on a preferred embodiment of the multiprocessor of the present invention. Additional extensions are defined to the standard set of pseudo-coded assembler mnemonics used in the earlier example. These extensions provide the programmer with a means to represent extensions available in (A') mnemonically.

| Action | Mnemonic |
| --- | --- |
| Write a data value to the result buffer with a usage count of c. | DRB(c) <- . . . |
| Write a condition code to the result buffer with a usage count of c. | CRB(c) <- . . . |
| Read a data value from the result buffer of processor p with an operation count displacement of d (-4, -3, -2, -1) | . . . <-- DRBp(d) DRBp(d) --> . . . |
| Read a condition code from the result buffer of processor p with an operation count displacement of -1. | CRBp(-1) --> . . . |

PROCESSOR 0 CODE FRAGMENT

Initial state: CPU0's DRB(0) contains base address with ref count of 3 CPU0's Register R2 also contains same base address

| Label | Opcode | Operands | ID |
| --- | --- | --- | --- |
|  | SPAWN | CPU1 --> STRM1 | IA |
|  | SPAWN | CPU2 --> STRM2 | IB |
| STRM0 | LOAD | R1 <-- MEM(R2 + OFFSET1) | I1 |
|  | ADD | DRB(1) <- R1, DRB1(-1) | I3 |
|  | NOOP |  | IC |
|  | COPY | R7 <-- DRB2(-1) | ID |
|  | BLE | CRB3(-1) --> PART20 | I9 |
|  | ADD | R9 <-- R7, DELTA2 | I10 |
| LOOP0 | NOOP |  | IE |
|  | ADD | DRB(2) <- DRB1(-1), R9 | I12 |
|  | MULT | DRB(2) <- DRB0(-1), DRB2(-1) | I17 |
|  | BLE | CRB3(-1) --> PART30 | I20 |

-continued

| Label | Opcode | Operands | ID |
| --- | --- | --- | --- |
|  | STORE | DRB0(-2)-> MEM(R7 + OFFSET5) | I21 |
|  | ADD | R7 <-- R7, DELTA5 | I28a |
|  | BLE | CRB2(-1) --> LOOP0 | I30a |
|  | B | ------------> PART20 | IF |
| PART30 | STORE | DRB1(-2)-> MEM(R7 + OFFSET5) | I25 |
|  | ADD | R7 <-- R7, DELTA5 | I28b |
|  | BLE | CRB2(-1) --> LOOP0 | I30b |
| PART20 | STORE | R7 --> MEM (R2 + OFFSET1) | I31 |
|  | EXIT |  |  |

PROCESSOR 1 CODE FRAGMENT

| Label | Opcode | Operands | ID |
| --- | --- | --- | --- |
|  | SPAWN | CPU3 --> STRM3 | IG |
| STRM1 | LOAD | DRB(1) <- MEM(DRB0(-3) + OFFSET2) | I2 |
|  | NOOP |  | IH |
|  | NOOP |  | II |
|  | COPY | R7 <-- DRB2(-1) | IJ |
|  | BLE | CRB3(-1) --> PART21 | I9 |
|  | NOOP |  | IK |
| LOOP1 | LOAD | DRB(2) <- MEM (R7 + OFFSET5) | I11 |
|  | SUB | R12 <-- DRB1(-1), DELTA3 | I13 |
|  | MULT | DRB(2) <- R12, DRB3(-1) | I18 |
|  | BLE | CRR3(-1) --> PART31 | I20 |
|  | NOOP | <-- DRB1(-2) | IL |
|  | ADD | R7 <-- R7, DELTA5 | I28a |
|  | BLE | CRB2(-1) --> LOOP1 | I30a |
|  | B | ----------> PART21 | IM |
| PART31 | NOOP | <-- DRB0(-2) | IN |
|  | ADD | R7 <-- R7, DELTA5 | I28b |
|  | BLE | CRB2(-1) --> LOOP1 | I30b |
| PART21 | NOOP |  | I0 |
|  | EXIT |  |  |

PROCESSOR 2 CODE FRAGMENT

| Label | Opcode | Operands | ID |
| --- | --- | --- | --- |
| STRM2 | LOAD | R5 <-- MEM(DRB0(-3) + OFFSET3) | I4 |
|  | SUB | R6 <-- R5, DELTA1 | I5 |
|  | MULT | DRB(5) <- DRB0(-1), R6 | I6 |
|  | COPY | R7 <-- DRB2(-1) | IP |
|  | BLE | CRB3(-1) --> PART22 | I9 |
|  | NOOP |  | IQ |
| LOOP2 | LOAD | DRB(2) <- MEM (R7 + OFFSET6) | I14 |
|  | SUB | DRB(1) <- DRB2(-1), DELTA4 | I16 |
|  | COPY | DRB(1) <- R7 | IR |
|  | NOOP |  | IS |
|  | ADD | R7 <-- R7, DELTA5 | I28 |
|  | CMP | CRB(4) <- R7, LIMIT | I29 |
|  | BLE | CRB2(-1) --> LOOP2 | I30 |
|  | NOOP |  | IT |
| PART22 | NOOP |  | IU |
|  | EXIT |  |  |

PROCESSOR 3 CODE FRAGMENT

| Label | Opcode | Operands | ID |
| --- | --- | --- | --- |
| STRM3 | LOAD | R8 <-- MEM(DRB0(-3) + OFFSET4) | I7 |
|  | NOOP |  | IV |
|  | NOOP |  | IW |
|  | CMP | CRB(4) <- DRB2(-1), R8 | I8 |
|  | BLE | CRB3(-1) --> PART23 | I9 |
|  | ADD | R9 <-- DRB2(-3), DELTA2 | I10 |
| LOOP3 | NOOP |  | IX |

-continued

| Label | Opcode | Operands | ID |
|---|---|---|---|
|  | ADD | DRB(2) <- DRB2(-1), R9 | I15 |
|  | CMP | CRB(3) <- DRB3(-1), DRB0(-1) | I19 |
|  | BLE | CRB3(-1) --> PART33 | I20 |
|  | ADD | R15 <-- DRB0(-2), DRB1(-2) | I22 |
|  | STORE | R15 -> MEM(DRB2(-3) + OFFSET6) | I23 |
|  | BLE | CRB2(-1) --> LOOP3 | I30a |
|  | B | ----------> PART23 | IY |
| PART33 | SUB | R15 <-- DRB0(-2), DRB1(-2) | I26 |
|  | STORE | R15 -> MEM(DRB2(-3) + OFFSET6) | I27 |
|  | BLE | CRB2(-1) --> LOOP3 | I30b |
| PART23 | NOOP |  | IZ |
|  | EXIT |  |  |

A number of instructions appear in the recoded co-requisite program fragments that did not appear in the original fragment. In addition, several instructions that appear in the original fragment appear in more than one of the recoded fragments. A brief explanation follows.

SPAWN instructions at the beginning of the processor 0 and processor 1 fragments initialize and synchronize the four co-requisite instruction streams.

The conditional path beginning at instruction 120 in the original fragment was recoded slightly (while maintaining equivalent function) to simplify the distribution of the streams. Other than exceptions related to this recoding, the control-flow instructions from the original fragment may be found in all of the recoded co-requisite fragments. This is logical, since all four co-requisite programs must follow similar control-flow paths to stay in "sync" with each other.

While the result buffers are used to enable communication between the four co-requisite programs, some of the data which passes through the result buffers is of a more permanent nature, and has to be moved to general purpose registers for future use. To this end, some instructions were added solely to transfer data values from result buffers to general purpose registers.

As stated earlier, since the present embodiment (shown here for ease of understanding) causes a processor's operation count to be incremented upon the execution of every instruction, in this particular embodiment it is necessary to include a number of no-op instructions to insure that each co-requisite code fragment executes the same number of instructions, and thus maintains the same operation count as the others.

Finally, since a data value written to the result buffer must be consumed by a given number of future instructions (as indicated by the usage count), the instructions IL and IN were added to conditional paths which would not normally consume the values, in order to assure that they are, in fact, consumed the correct number of times (so as to insure that the usage count reaches zero). It is important to note that embodiments which incorporate result buffer management method M2 have no usage counts, and thus, are not subject to such requirements.

EXECUTION TIMING

The following shows the cycle-by-cycle execution behavior of the four co-requisite program fragments when executed simultaneously on four "simple" processors of an SMP extended as prescribed by the present embodiment. Note that the timings shown assume the same simplifications as did the previous timing examples, and show the code following the same execution path as it did in the previous timing examples.

EXECUTION TIMING FOR THE SAMPLE COREQUISITE PROGRAM FRAGMENTS ON THE EXTENDED ISA OF THE PRESENT INVENTION

| Cycle | CPU0 | CPU1 | CPU2 | CPU3 |
|---|---|---|---|---|
| 1 | IA | ? | ? | ? |
| 2 | IB | IG | ? | ? |
| 3 | I1 | I2 | I4 | I7 |
| 4 | I3 | IH | I5 | IV |
| 5 | IC | II | I6 | IW |
| 6 | ID | IJ | IP | I8 |
| 7 | I9 (N) | I9 (N) | I9(N) | I9 (N) |
| 8 | I10 | IK | IQ | I10 |
| 9 | IE | I11 | I14 | IX |
| 10 | I12 | I13 | I16 | I15 |
| 11 | I17 | I18 | IR | I19 |
| 12 | I20 (T) | I20(T) | IS | I20 (T) |
| 13 | I25 | IN | I28 | I26 |
| 14 | I28b | I28b | I29 | I27 |
| 15 | I30b(T) | I30b(T) | I30(T) | I30b(T) |
| 16 | IE | I11 | I14 | IX |
| 17 | I12 | I13 | I16 | I15 |
| 18 | I17 | I18 | IR | I19 |
| 19 | I20(N) | I20(N) | IS | I20 (N) |
| 20 | I21 | IL | I28 | I22 |
| 21 | I28a | I28a | I29 | I23 |
| 22 | I30a(N) | I30a(N) | I30(N) | I30a(N) |
| 23 | IF | IM | IT | IY |
| 24 | I31 | IO | IU | IZ |

As can be seen in the above example, when the simple implementation of the prior art ISA (A), which took 44 cycles to execute the program fragment, is extended as per the present embodiment to an ISA (A'), and the program fragment is distributed amongst four processors, each of which being a simple implementation as (A'), according to a preferred embodiment, it takes 24 cycles to execute the distributed program fragment (including the one-time synchronization instructions executed beforehand). This comes quite close to the 20 cycle execution time for a complex implementation of (A) (i.e. a superscalar processor).

Looking more closely at unanticipated stall conditions due to cache misses, mispredicted branches, and other factors, embodiments of the present invention, do to its asynchronous nature, exhibit the same performance characteristics as do the most aggressive out-of-order execution, superscalar processors, i.e., they continue to do as much work as possible, despite the fact that one instruction has stalled.

For example, in the present embodiment, it is possible that all four instruction streams may execute load instructions during the same cycle. If one of the four misses the cache, the other three are still able to proceed in executing subsequent instructions (provided, of course, that there are no dependencies on the stalled instruction stream). Thus the other three continue to execute instructions, some of which may also be load instructions which may hit or miss the cache. Such behavior is equivalent to that of a single "complex" processor which continues to execute non-dependent instructions out of order after encountering a cache miss.

In the case of mispredicted branches, the multiple, simultaneously executing branches in the co-requisite streams executed on an SMP extended as prescribed by the present embodiment, incur the same penalties incurred in a "complex" processor that mispredicts a branch.

Alternatively, it is possible to employ the techniques taught in the present invention to utilize the SPAWN instruction, creating a second instruction stream following a conditional branch, causing both the taken and non-taken paths of the branch to execute simultaneously until the condition is resolved and one of the streams may be terminated. Such an approach mimics the very sophisticated speculative execution capabilities found in some "complex" processors.

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:

an execution unit, wherein said execution unit executes an instruction to generate an output value;

a result buffer containing a plurality of entries, wherein an entry among said plurality of entries can be allocated to hold an output value of an instruction executed by said execution unit; and an operation counter containing an operation count that is incremented at least when an instruction storing an output value to said result buffer is executed by said execution unit, said instruction being associated with a single operation count contained by said operation counter when said instruction is executed, wherein a particular entry in said result buffer is allocated for a given output value in response to said single operation count associated with the instruction generating said given output value.

2. The apparatus of claim 1, wherein each output value in said result buffer is stored in association with a usage count, wherein each usage count indicates a number of times an associated output value will be used as an input specified by other instructions executed in another one or more apparatus.

3. The apparatus of claim 1, further comprising a decoder that extracts an apparatus identifier from an instruction to be executed by said execution unit that identifies one of a plurality of apparatus, wherein one or more input values for said instruction are retrieved from said result buffer of said identified apparatus.

4. The apparatus of claim 3, wherein said decoder extracts a displacement value from said instruction to be executed by said execution unit that provides a relative difference between an operation count of an apparatus executing said instruction and an expected operation count of said identified apparatus that is associated with the entry for the one or more input values in the result buffer of the identified apparatus, wherein said decoder generates an access key in response to said displacement value and an operation count of the apparatus executing the instruction and retrieves an input value from said result buffer of the identified apparatus at an entry associated with said access key.

5. The apparatus of claim 4, wherein said displacement value is constrained to be less than a selected amount.

6. The apparatus of claim 1, and further comprising a program counter.

7. A multiprocessor computer system comprising:

a plurality of processors, wherein each processor includes:

an execution unit, wherein said execution unit executes an instruction utilizing one or more input values to generate an output value;

a result buffer containing a plurality of entries, wherein an entry among said plurality of entries can be allocated to hold an output value of an instruction executed by the execution unit;

an operation counter containing an operation count that is incremented at least when an instruction storing an output value to the result buffer is executed by the execution unit, wherein a particular entry allocated in said result buffer for a given output value in response to said operation count when an instruction generating said given output value is executed; and a decoder that extracts a processor identifier from an instruction to be executed by said execution unit that identifies one of said plurality of processors, wherein one or more input values of said instruction are retrieved from said result buffer of said identified processor.

8. The multiprocessor computer system of claim 7, wherein each decoder extracts a displacement value from said instruction to be executed by said execution unit that provides a relative difference between an operation count of a processor executing said instruction and an expected operation count of said identified processor that is associated with the entry of said one or more input values in said result buffer of said identified processor, wherein said decoder generates an access key in response to said displacement value and an operation count of said processor executing said instruction and retrieves an input value from said result buffer of said identified processor at an entry associated with said access key.

9. The multiprocessor computer system of claim 8, wherein said displacement value is constrained to be less than a selected amount.

10. The multiprocessor computer system of claim 7, and further comprising a shared memory accessible to said plurality of processors.

11. The multiprocessor computer system of claim 7, wherein each output value in said result buffer is stored in association with a usage count, wherein each usage count indicates a number of times an associated output value will be used as an input specified by other instructions executed in at least one other of said plurality of processors.

12. The multiprocessor computer system of claim 7, each of said plurality of processors further comprising a program counter.

13. A method of processing data in a data processing system, said method comprising:

executing an instruction that generates an output value to be stored in a result buffer;

incrementing an operation count to obtain a single operation count associated with said instruction; and storing the output value in an entry of the result buffer, wherein the entry is indicated by the single operation count associated with the instruction.

14. The method of claim 13, and further comprising the step of generating a usage count that is stored in the result buffer in association with the output value, wherein the usage count indicates a number of times the associated output value will be used as an input specified by other instructions executed in at least one other processor.

15. The method of claim 13, and further comprising the step of decoding an instruction prior to the instruction being executed in order to extract a processor identifier that identifies one of a plurality of processors, wherein one or more input values for the instruction are retrieved from a result buffer of the identified processor.

16. The method of claim 15, wherein the step of decoding includes extracting a displacement value that provides a relative difference between an operation count of a processor executing the instruction and an expected operation count of the identified processor that is associated with the entry of the one or more input values in the result buffer of the identified processor, further comprising the step of generating an access key as a function of the displacement value and an operation count of the processor executing the instruction and retrieving the input value from the result buffer of the identified processor at an entry associated with the access key.

17. The method of claim 16, and further comprising the step of:

preventing said displacement value from exceeding a selected amount.

18. A method of storing a result in a multiprocessing system having a plurality of processors, the method comprising:

executing an instruction within one of the plurality of processors that generates a result;

incrementing an operation count associated with the one processor in response to execution of said instruction, wherein the result is uniquely identified by its association with the one processor and the incremented operation count; and storing the result within the multiprocessing system such that the result is accessed in storage by any processor of the plurality of processors by its unique identity defined by the one processor and the incremented operation count.

19. The method of claim 18, and further comprising the step of generating a usage count that is stored in association with the result, wherein the usage count indicates a number of times the associated result will be used as an input specified by other instructions executed in one or more processors of the plurality of processors.

20. The method of claim 18, and further comprising the step of preventing operation counts of said plurality of processors from differing more than a selected amount.

* * * * *

UNITED STATES PATENT AND TRADEMARK OFFICE
CERTIFICATE OF CORRECTION

PATENT NO. : 5,889,947
DATED : Mar. 30, 1999
INVENTOR(S) : *Starke*

It is certified that error appears in the above-identified patent and that said Letters Patent is hereby corrected as shown below:

In col. 16, line 27, please change "CRR3(-1)" to --CRB3(-1)--.

Signed and Sealed this

Second Day of November, 1999

Attest:

Q. TODD DICKINSON

*Attesting Officer*   Acting Commissioner of Patents and Trademarks